March 17, 1931.  H. W. MARTIN  1,795,953
AUTOMATIC SWITCH CONTROL
Filed Jan. 28, 1929
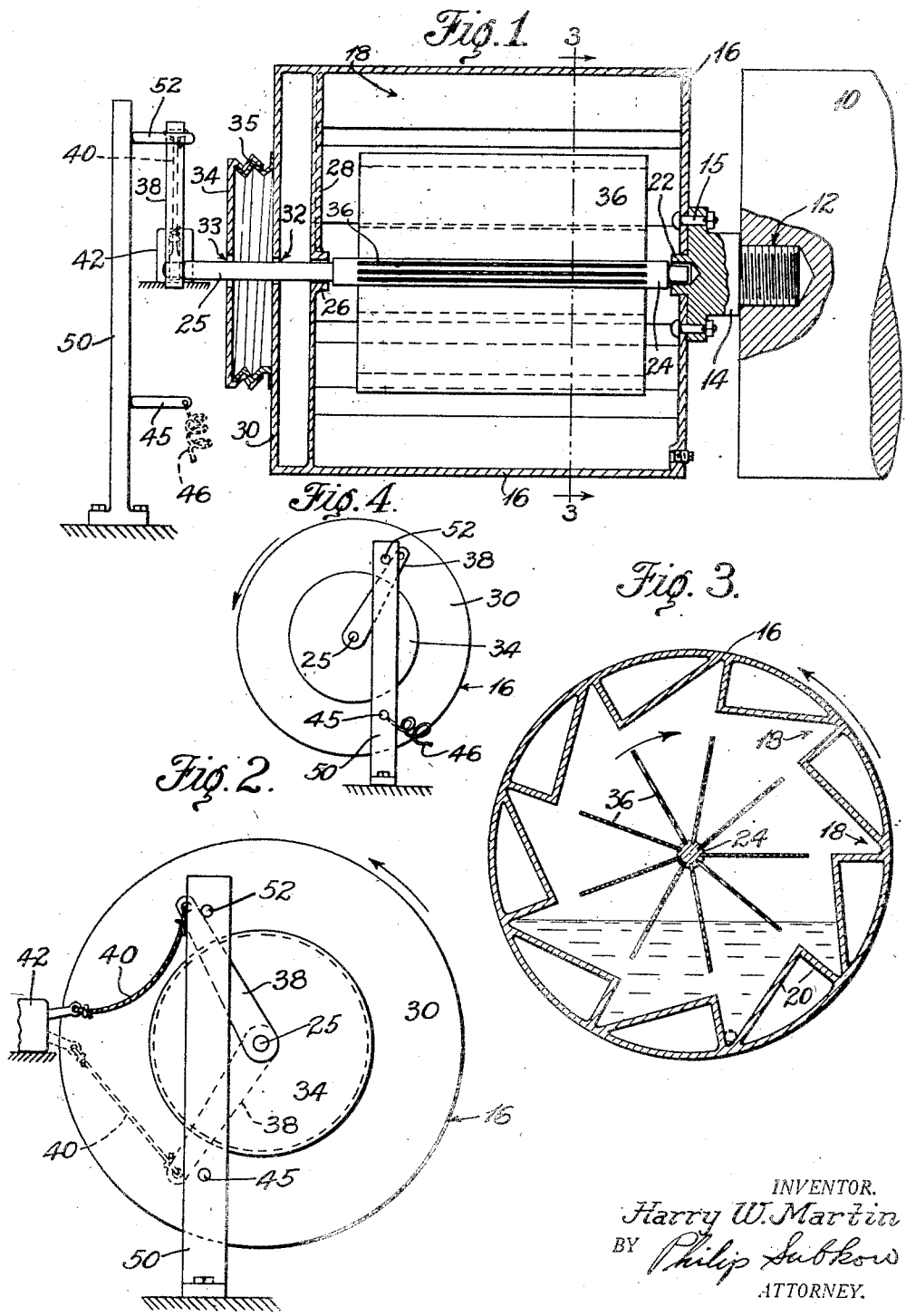
INVENTOR.
Harry W. Martin
BY Philip Subkow
ATTORNEY.

Patented Mar. 17, 1931

1,796,953

UNITED STATES PATENT OFFICE

HARRY W. MARTIN, OF MARICOPA, CALIFORNIA, ASSIGNOR TO UNION OIL COMPANY OF CALIFORNIA, OF LOS ANGELES, CALIFORNIA, A CORPORATION OF CALIFORNIA

AUTOMATIC SWITCH CONTROL

Application filed January 28, 1929. Serial No. 335,617.

This invention relates to devices for automatically cutting out motors or engines where the speed of the motor or engine drops to a predetermined minimum, or the motor or engine stops, or the speed thereof exceeds a predetermined maximum.

In many cases where various devices such as oil well equipment are driven by electric motors or gas engines, the slippage of a belt, for example, has been sufficient for the motor to continue running while the driven mechanism ceased to travel with the result that the motor would race or burn out. Similarly in the case of a temporary stoppage of current to an electric motor resulting in stopping of the driven mechanism, a return of full current supply to the line has often resulted in burning out of the motor.

It is the primary object of the present invention to provide means which will cut out the motor automatically in any of the eventualities stated, thereby avoiding damage to the rig, driven mechanism, motors and incidental equipment.

Broadly stated, the invention resides in means to be mounted on a driven part, for example the band wheel shaft on an oil well rig, which part cooperates with an independently movable device to hold said independently movable device in position to maintain ignition or power supply to the motor or engine when the latter is operating within a desired speed range, and to move to break the current when the driven mechanism stops, drops or exceeds the desired speed.

In a preferred form the operation of the driven part by the independently movable part is accomplished through the medium of a liquid which is carried by pockets on the driven part and allowed to fall upon blades carried by the independently movable member. The weight of the liquid upon said blades is sufficient to overbalance an arm carried by the independently movable member to hold said arm normally against a stop when the liquid lies on blades upon one side of the axis of said independently movable member. When the member carrying the pockets ceases to move so that the liquid runs off of the ends of the blades, or when said member exceeds a certain speed so that centrifugal force provided thereby causes the liquid to be thrown upon blades upon the opposite side of said axis, the overbalanced arm will become unbalanced and drop by gravity to throw a switch to cut off the motor or engine, or to ground the ignition of an engine, according to the conditions existing.

In the accompanying drawings wherein a preferred embodiment of the invention is shown by way of illustration, Fig. 1 is a vertical longitudinal section through the device;

Fig. 2 is an end elevation thereof indicating connections for operating a switch or to ground an ignition line;

Fig. 3 is a cross section taken on the line 3—3 of Fig. 1; and

Fig. 4 is an end elevation of a slight modification.

In the drawings, Fig. 1 shows the end of a shaft 10 which may be the band wheel shaft of drilling rigs used in oil fields. This shaft 10 is drilled and tapped at 12 to receive a threaded coupling 14 bolted at 15 to a shell 16 which forms the housing of the control and is supported by and adapted to rotate with the shaft 10. The shell 16 is conveniently provided with a plurality of liquid receiving pockets 18 as best indicated in Fig. 3, which pockets may be formed by securing angular ledges 20 in position as indicated or by any other suitable means adapted to receive and carry up small quantities of liquid as the shell 16 rotates in the direction indicated by the arrow.

The coupling 14 is provided with a boss 22 which projects through the end wall of the shell 16 and is drilled out to provide a trunnion for the reduced end of an independently rotatable shaft 24 whose axis is co-incident with the axis of the shell 16 and is provided at its opposite end with a reduced extension 25 journaled in a bearing 26 provided in a solid or skeleton wall 28 spaced somewhat from the outer end wall 30 in the shell 16. Said extension 25 passes through an aperture 32 in the wall 30 and also through an aperture 33 in a cap 34 which is screwed upon a flange 35 secured to the wall 30. This arrangement of cap and end wall 30 provides sufficiently for the prevention of the travel of liquid from within the shell 16 along the reduced portion 25 to the exterior.

Carried upon and radially disposed about the shaft 24 with the shell 16, is a plurality of blades 36 adapted to receive liquid spilled from the pockets 18, the liquid being adapted to run out from the ends of the troughs formed between upwardly directed blades 36.

Upon the projecting end of the extension 25 is fixed a weighted arm 38 which when the parts are inoperative will by influence of gravity assume a dependent position.

The arm 38 may serve to control the motor or engine by being connected through the medium of a cable 40 with a switch 42 so that when the arm 38 drops it will move the switch arm 44 downward and cut off current. If desired the arm 38 could be used as a grounding element adapted to engage a stop 45 when in lowermost position for grounding an ignition line 46 leading to an engine driving the shaft 10. The stop 45 will be carried by a standard 50 which carries at its upper end a stop 52 adapted to be engaged by the arm 38 when actuated into an uppermost position (as indicated in Figs. 1 and 2) by means of quantities of liquid spilled from the pockets 18 upon the blades 36.

In operating with this switch control, rotation is imparted to the shell 16 through the medium of the coupling 14 from the shaft 10 of any mechanism being driven, such as a band wheel. As the shell 16 rotates in the direction indicated by the arrow in Fig. 3, a quantity of oil which is placed in the shell to fill approximately one-third thereof, is picked up by the ledges 20 which form the pockets 18, and when the device travels at a moderate rate of speed is spilled upon blades 36 at the right of Fig. 3 to overbalance the arm 38 carried by the shaft 24, 25 and cause the blades 36 to rotate in a counterclockwise direction until the arm 38 engages the stop 52. As long as the desired rate of speed is maintained the weight of the liquid being discharged upon blades 36 by said pockets 18 will keep the arm 38 overbalanced and in the upper or full line position indicated in the drawings. However, if the motor or engine should fail or the belt slip so that the shaft 10 and shell 16 cease rotation or fall back to a speed insufficient to carry the oil in quantity capable of overbalancing the arm 38, said arm will descend to the dotted line position of Fig. 2 and pull switch arm 44 thus cutting off current to the motor or engine. Or as previously indicated, the ignition current to an explosive engine may be grounded by engagement of arm 38 with stop 45. On the other hand if the speed exceeds a predetermined rate, centrifugal force due to the rapid rotation of the shell 16 will cause the oil in the cups 18 to be carried across the top and then to be spilled upon the blades 36 on the left side of the shaft 24 as seen in Fig. 3, whereupon the arm 38 will fall and cut off the motor or engine as in the other instance. Similarly as seen in Fig. 4, stop 52 could be placed at the other side of arm 38 from that shown in Fig. 2 so that the normal rate of speed would be high and the oil in the pockets would be normally thrown on the blades at the left side to maintain said arm 38 against stop 52, a material reduction in speed causing the oil to fall on the right side instead of the left, whereupon the arm 38 would descend.

From the foregoing it will be clear that a switch for motors or engines may be automatically controlled by the speed of the parts driven by such motors or engines in order to cut out the latter at either exceedingly high or undesirably low speeds. Thus racing or burning out is prevented, and motors are protected against temporary shut-offs of current, slipping belts, and the like. It is to be understood that while I have here disclosed a preferred embodiment, many other forms of the invention will be apparent to those skilled in the art, and that I am not to be limited except as defined by the accompanying claims.

I claim:

1. An automatic switch control comprising a driven member adapted to be mounted upon and driven by a moving device, an independently movable member cooperating with the driven member, means for effecting limited movement of the movable member through movement of the driven member, said means also effecting return movement of the movable member upon predetermined increases and decreases of speed of the driven member, and switch-actuating means controlled by movement of the movable member.

2. An automatic switch control comprising a driven member adapted to be driven by a moving device, an independently movable member, means for effecting limited movement of the movable member by movements of the driven member and to vary the direction of movement of the movable member upon predetermined increase in speed of the driven member, and switch actuating means controlled by movement of the movable member.

3. An automatic switch control comprising a primary rotary member having means to receive fluid material and adapted to be driven by a rotary mechanism to be controlled, an independently rotary member having means adapted to receive fluid material discharged from the primary member for gravity actuation of the second member through movements of the primary rotary member, means to limit the movement of the latter to less than approximately one revolution in each direction, and switch governing mechanism actuable by the independently rotary member.

4. An automatic switch control comprising a driven rotary member adapted to be actuated by a moving mechanism to be controlled, means on said driven member for picking up liquid to be discharged as the latter member rotates, a second rotary member having means providing pockets to receive liquid from the driven member and to be gradually drained of such liquid, means to limit movement of said second member, said second member assuming different positions according as the points of discharge and amounts of discharge of liquid from the driven member are varied by the speed of said driven member, and switch controlling means controlled by said second rotary member.

5. A construction according to claim 4 wherein the switch controlling means includes an arm carried by the second rotary member, which arm is adapted to return to normal position by gravity when relieved of the overbalancing influences of liquid discharged by the driven member.

6. A construction according to claim 4 wherein the second rotary member is mounted within the driven member, and the driven member contains the liquid picked up thereby.

7. A construction according to claim 4 wherein the second rotary member is carried within the driven member and both are rotatable about a common axis.

8. A construction according to claim 4 wherein the second rotary member is provided with a plurality of axially extending blades radially disposed about its axis whereby open ended pockets are formed by upwardly directed blades for receiving the liquid discharged by the driven member.

9. An automatic switch control comprising a container adapted to be fixed upon a rotary driven device to be controlled, said container being adapted to receive a quantity of liquid and having pockets to carry liquid up and spill the same as the container rotates, a member journaled within said container for independent limited rotation and having means to receive and temporarily retain liquid spilled from said pockets whereby the weight of such liquid causes rotation of said member, an exteriorly disposed arm connected with and movable with said member, and a control for said rotary driven device operable by said arm.

10. An automatic switch control comprising a primary driven member having pockets adapted to receive a mobile material, said member being adapted to be driven by mechanism to be controlled, an independently movable member having pockets adapted to receive material discharged from the pockets of the primary member to produce motion in the independently movable member, means to limit the movement of the latter and switch governing mechanism actuable by the independently movable member upon predetermined variation in discharge from the primary member.

11. An automatic switch control comprising a primary driven member having pockets adapted to receive a mobile material, said member being adapted to be driven by mechanism to be controlled, an independently movable member having pockets adapted to receive material discharged from the pockets of the primary member to produce motion in the independently movable member, means to limit the movement of the latter and switch governing mechanism actuable by the independently movable member upon predetermined variation in discharge from the primary member, both above and below upper and lower speed limits respectively.

Signed at Taft, in the county of Kern, and State of California, this 4 day of Jan. A. D. 1929.

HARRY W. MARTIN.